United States Patent
Zeng et al.

(10) Patent No.: US 12,363,095 B2
(45) Date of Patent: Jul. 15, 2025

(54) DEVICE AUTHENTICATION METHOD AND ELECTRONIC DEVICE

(71) Applicant: GUANGDONG OPPO MOBILE TELECOMMUNICATIONS CORP., LTD., Guangdong (CN)

(72) Inventors: Chunliang Zeng, Guangdong (CN); Zhaoxuan Zhai, Guangdong (CN); Zhigang Yu, Guangdong (CN); Taiyue Wu, Guangdong (CN); Tao Feng, Guangdong (CN); Qichang Yang, Guangdong (CN); Yunfeng Cheng, Guangdong (CN); Xiangwen Huang, Guangdong (CN); Zhao Chen, Guangdong (CN); Zuo Fan, Guangdong (CN); Difan Chen, Guangdong (CN); Yiding Ouyang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 238 days.

(21) Appl. No.: 18/148,363

(22) Filed: Dec. 29, 2022

(65) Prior Publication Data
US 2023/0275888 A1 Aug. 31, 2023

Related U.S. Application Data

(63) Continuation of application No. PCT/CN2021/114093, filed on Aug. 23, 2021.

(30) Foreign Application Priority Data

Aug. 31, 2020 (CN) .......................... 202010898734.1

(51) Int. Cl.
*H04L 9/40* (2022.01)
*H04L 9/06* (2006.01)
(Continued)

(52) U.S. Cl.
CPC ........ *H04L 63/0823* (2013.01); *H04L 9/0656* (2013.01); *H04L 63/166* (2013.01);
(Continued)

(58) Field of Classification Search
None
See application file for complete search history.

(56) References Cited

U.S. PATENT DOCUMENTS

| 2004/0030887 A1* | 2/2004 | Harrisville-Wolff | .... H04L 63/08 713/155 |
| 2004/0039911 A1* | 2/2004 | Oka | ........................ G06F 21/10 705/51 |

(Continued)

FOREIGN PATENT DOCUMENTS

| CN | 1476580 A | * 2/2004 | ............. G06F 21/10 |
| CN | 101753532 A | 6/2010 | |

(Continued)

OTHER PUBLICATIONS

WIPO, International Search Report and Written Opinion for International Application No. PCT/CN2021/114093, Oct. 29, 2021.
(Continued)

*Primary Examiner* — Ali H. Cheema
(74) *Attorney, Agent, or Firm* — Hodgson Russ LLP

(57) ABSTRACT

A device authentication method, an authentication apparatus and a computer-readable storage medium may be provided to authenticate an electronic device. In some implementations, the device authentication method includes: establishing a first connection based on a transparent layer security (TLS) protocol between the electronic device and a first server; sending a first request to the first server to perform identity authentication of the electronic device, the first request being generated on the basis of first information which represents a digital certificate of the electronic device;
(Continued)

and on the basis of the first connection, receiving first response information about the first request, the first response information being sent by the first server and carrying a result of the identity authentication of the electronic device performed by the first server.

13 Claims, 5 Drawing Sheets

(51) Int. Cl.
    *G06F 21/33*     (2013.01)
    *G06F 21/44*     (2013.01)
    *H04L 9/32*     (2006.01)

(52) U.S. Cl.
    CPC .............. *G06F 21/33* (2013.01); *G06F 21/44* (2013.01); *H04L 9/3268* (2013.01); *H04L 9/40* (2022.05)

(56) References Cited

U.S. PATENT DOCUMENTS

| | | | | |
|---|---|---|---|---|
| 2010/0318784 | A1* | 12/2010 | Rao | H04L 63/166 713/168 |
| 2012/0030471 | A1* | 2/2012 | Li | H04L 9/321 713/176 |
| 2014/0325592 | A1* | 10/2014 | Unagami | G06Q 30/02 726/1 |
| 2019/0042708 | A1 | 2/2019 | Pala et al. | |
| 2020/0097948 | A1* | 3/2020 | Sheets | G06Q 20/326 |
| 2021/0142336 | A1* | 5/2021 | Suk | G06F 16/583 |
| 2022/0045848 | A1* | 2/2022 | Hulshof | H04L 9/3236 |

FOREIGN PATENT DOCUMENTS

| | | | | |
|---|---|---|---|---|
| CN | 106534086 | | 3/2017 | |
| CN | 106534086 | A * | 3/2017 | ............. H04L 63/08 |
| CN | 106657033 | A | 5/2017 | |
| CN | 107682160 | | 2/2018 | |
| CN | 108880821 | A | 11/2018 | |
| CN | 109005187 | A | 12/2018 | |
| CN | 109088731 | A | 12/2018 | |
| CN | 109309684 | A | 2/2019 | |
| CN | 110380868 | A | 10/2019 | |
| CN | 110855606 | | 2/2020 | |
| CN | 110971617 | A * | 4/2020 | ......... H04L 63/0823 |
| CN | 111543070 | A | 8/2020 | |
| CN | 111949967 | A | 11/2020 | |
| GB | 2372344 | A * | 8/2002 | ............. G06Q 20/02 |
| JP | 2003085143 | A * | 3/2003 | |
| JP | 2017158034 | A * | 9/2017 | |
| WO | WO-2018098950 | A1 * | 6/2018 | ............... H04L 9/32 |
| WO | 2020091789 | | 5/2020 | |

OTHER PUBLICATIONS

CNIPA, First Office Action for CN Application No. 202010898734.1, Sep. 22, 2023.
EPO, Extended European Search Report for EP Application No. 21860325.6, Dec. 19, 2023.
EPO, Communication for EP Application No. 21860325.6, Feb. 28, 2025.

\* cited by examiner

DEVICE AUTHENTICATION METHOD AND ELECTRONIC DEVICE

CROSS REFERENCE TO RELATED APPLICATIONS

The present application is a continuation of International Patent Application No. PCT/CN2021/114093, filed Aug. 23, 2021, which claims priority to Chinese Patent Application No. 202010898734.1, filed Aug. 31, 2020, the entire disclosures of which are incorporated herein by reference.

TECHNICAL FIELD

The present disclosure relates to the field of Internet of Things, and in particular to a device authentication method, and an electronic device.

BACKGROUND

A device needs to be authenticated by a network side when the device is going to join the Internet of things (IoT). In the related art, a device authentication process leads to an increase of network resource overhead.

SUMMARY OF THE DISCLOSURE

A device authentication method and an electronic device may be provided in some embodiments of the present disclosure to solve the problems in the related art.

Some embodiments of the present disclosure provide a device authentication method performed by an electronic device, and the method includes: establishing, based on a Transport Layer Security (TLS) protocol, a first connection with a first server; sending, based on the first connection, a first request to the first server, wherein the first request is configured to request for an identity authentication of the electronic device, the first request is generated based on first information, and the first information represents a digital certificate of the electronic device; and receiving, based on the first connection, first response information about the first request sent by the first server, wherein the first response information carries a result of the identity authentication of the electronic device, and the identity authentication is performed by the first server.

Some embodiments of the present disclosure further provide another device authentication method performed by a first server, the method includes: establishing, based on a Transport Layer Security (TLS) protocol, a first connection with an electronic device; receiving, based on the first connection, a first request sent by the electronic device, wherein the first request is configured to request for an identity authentication of the electronic device, the first request is generated based on first information, and the first information represents a digital certificate of the electronic device; performing, based on the first request, the identity authentication of the electronic device, and obtaining a result of the identity authentication; and sending, based on the first connection, first response information about the first request to the electronic device, wherein the first response information carries the result of the identity authentication.

Some embodiments of the present disclosure further provide an electronic device. The electronic device includes a processor and a memory, the memory is configured to store computer programs which are executable by the processor. The processor is configured to perform the method as previously described in response to the computer program being executed.

DETAILED DESCRIPTION

Figure 1:
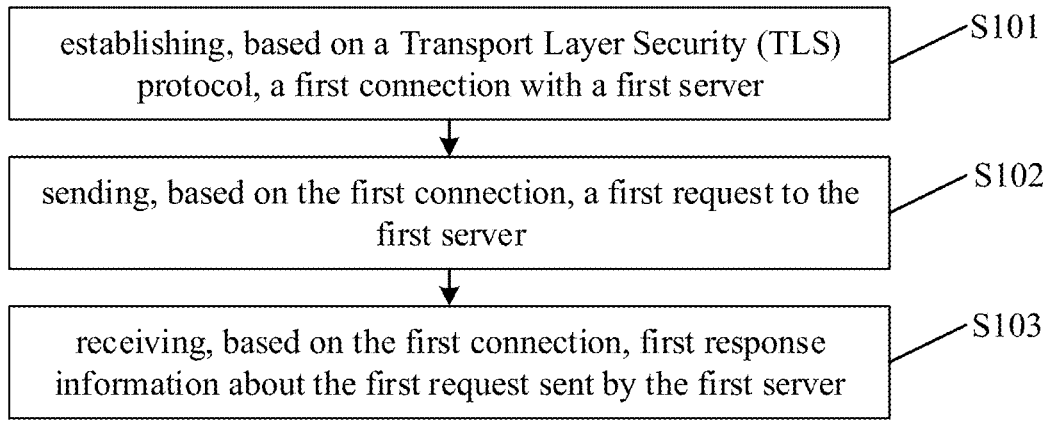
FIG. 1 is a schematic implementing flowchart of a device authentication method according to an embodiment of the present disclosure.

FIG. 1 illustrates a schematic implementing flowchart of a device authentication method according to an embodiment of the present disclosure. With the device authentication method, an identity of an electronic device may be authenticated to verify whether the electronic device is legal during a registration and binding process of the electronic device, such that it is possible to ensure that data may be transferred safely during the communication in the internet of things. As shown in FIG. 1, the method may be performed by an electronic device, and includes the following operations.

In an operation S101, a first connection may be established with a first server based on a TLS (Transport Layer Security) protocol.

The first connection based on the TLS protocol may be established between the electronic device and the first server. In some embodiments, the electronic device may refer to an IOT device, such as a radio-frequency identification device, an infrared sensor, and the like. The first server may be a platform configured to perform an identity authentication of the electronic device, and the data may be encrypted when the data is transmitted through the TLS protocol. The first connection established based on the TLS protocol may encrypt the transmitting information in the first connection, and the safety of the information transmission may be ensured. In practical application, the TLS protocol may be optional, and the TLS protocol may be used only after the electronic device and the first server have been configured. A stateful connection may be negotiated for data transmission through a handshake process in case that both the electronic device and the first server agree to use the TLS protocol.

In an operation S102, a first request may be sent to the first server based on the first connection. The first request may be configured to request for the identity authentication of the electronic device. The first request may be generated based on first information. The first information may represent a digital certificate of the electronic device.

Herein, the first request may be sent to the first server based on the first connection which is established based on the TLS protocol. The first request may be configured to request for the identity authentication of the electronic device. The first request is generated based on the first information. The first information may represent the digital certificate of the electronic device. In some embodiments, the digital certificate may refer to a digital authentication of identity information. The digital certificate of the electronic device may bind the identity of the electronic device with the electronic device, and the identity of the electronic device may be recognized through the digital certificate of the electronic device. For example, the digital certificate of the electronic device may be a device certificate of the electronic device, and identities of different electronic devices may be recognized through the device certificates of the electronic devices. The digital certificate of the electronic device may also be a product certificate of the electronic device, and a product model of the electronic device may be determined through the product certificate. In practical application, an authentication process may be completed according to the digital certificate of the electronic device in the process of authenticating the electronic device. The first request may include the first information, and the first server may perform the identity authentication or authenticate the identity of the electronic device according to the first information of the first request received by the first server.

In an operation S103, first response information about the first request may be received based on the first connection, the first response information is sent by the first server and carries a result of the identity authentication of the electronic device, and the identity authentication is performed by the first server.

Herein, the first response information, sent by the first server, about the first request may be received based on the first connection, the first response information carries the result of the identity authentication of the electronic device, and the identity authentication may be performed by the first server, i.e., the first server is configured to authenticate the identity of the electronic device. In practical application, the electronic device may receive the result of the identity authentication sent by the first server through the first connection after the first server performs the authentication of the electronic device. In some embodiments, the result of the identity authentication may include a result indicating that the identity authentication is successful and a result indicating that the identity authentication is failed. Subsequent data interaction may be continued between the electronic device and the first server in response to the first response information representing that the identity authentication is successful. In practical application, the first server may return one device certificate to the electronic device through the first connection when the electronic device authentication is authenticated by the first server. The electronic device may receive the device certificate sent by the first server without other connection channels. The device certificate may be a legal/valid/authorized identity certificate issued and sent by the first server for the electronic device.

In this way, it is possible to ensure the security of the device certificate during the transmission and reduce a possibility of a leakage of the device certificate by receiving the device certificate sent by the first server through the first connection.

In above embodiments, the first connection may be established between the electronic device and the first server based on the TLS protocol. The first request may be sent to the first server based on the first connection. The first request may be configured to request for the identity authentication of the electronic device. The first request may be generated based on the first information. The first information represents the digital certificate of the electronic device. The first response information about the first request sent by the first server may be received based on the first connection, the first response information carries the result of the identity authentication of the electronic device, and the identity authentication is performed by the first server. In this way, the device authentication may be completed between the first server and the device via the connection based on the TLS protocol, without needing other connection channels. Thus, a demand for the network resource in the authentication process may be reduced, the security of the data transmission during the authenticating process may be improved, and a leakage of information of the device may be avoided.

In an embodiment, the first information may include the device certificate of the electronic device.

The first information may include the device certificate of the electronic device. The device certificate may be a certificate issued and sent by a trusted organization to prove the unique legal identity of the device, and a format of the device certificate may be X.509. The electronic device may generate the first request according to the first information and send the first request to the first server. The first server may perform the authentication of the electronic device according to the device certificate of the electronic device in the first information after receiving the first request.

In above embodiments, the first information may include the device certificate of the electronic device. In this way, the identity of the electronic device may be authenticated through the device certificate of the electronic device. The identity authentication may be achieved according to different information of the electronic device, and the applicability of the authentication of the electronic device may be improved.

Figure 2:
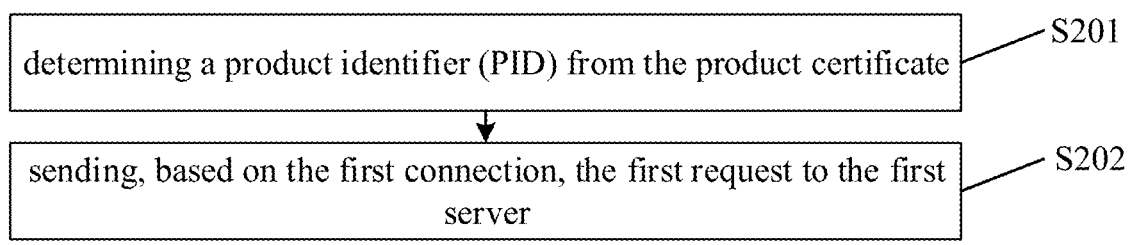
FIG. 2 is a schematic implementing flowchart of a device authentication method according to an embodiment of the present disclosure.

In an embodiment, as shown in FIG. 2, the first information may include the product certificate of the electronic device. The operation of sending the first request to the first server based on the first connection may include following operations.

In an operation S201, a PID (product identifier) may be determined from the product certificate.

The first information may include the product certificate of the electronic device. The product certificate may be a legal identity certificate issued and sent for the electronic device of the same model. A format of the product certificate may be X.509. The PID needs to be determined from the product certificate when the electronic device is authenticated by the first server. The product certificate may include the PID corresponding to the electronic device, and the PID corresponding to the electronic device may be determined by referring to the product certificate.

In an operation S202, the first request may be sent to the first server based on the first connection, and the first request carries at least the PID and a VID (vendor identifier), and the VID is preset in the electronic device.

The first request may be sent to the first server via the first connection. The first request carries at least the PID and the VID of the electronic device. In some embodiments, the VID may be preset in the electronic device and written by the device alone or solely, and the VID may be registered with the first server in advance. In practical application, during the authentication of the electronic device, the first server may determine the legality of the electronic device according to the PID and VID of the electronic device through the first request carrying the PID and the VID. The electronic device may receive the result of the identity authentication sent by the first server through the first connection when the first server determines that the electronic device is legal. In practical application, the product certificates corresponding to the electronic devices of the same model may be the same with each other. Therefore, the first server needs to issue and send different device certificates to the electronic devices of the same model, such that the authentication of the electronic device may be accomplished. In practical application, the product certificates of the electronic devices of the same model may be the same with each other, but the VIDs corresponding to the electronic devices of the same model may be different from each other. Therefore, a bulk of VIDs corresponding to the electronic devices of the same model may be input and imported into the first server to achieve the bulk identity authentication of the electronic devices.

In above embodiments, the first information may include the product certificate of the electronic device. The PID may be determined from the product certificate. The first request may be sent to the first server based on the first connection, and the first request carries at least the PID and the VID, and the VID is preset in the electronic device. Therefore, the authentication of the electronic device may be achieved through the device information of the electronic device in case that the digital certificate of the electronic device is the product certificate, and the certificate may be issued and sent to the electronic device. Thus, the authentication of the electronic device may be accomplished according to different information of the electronic device, and the applicability of the authentication of the electronic device may be improved. Furthermore, the device information of the electronic device may be imported into the first server in bulk, and the bulk identity authentication of the electronic device may be achieved.

In some embodiments, the first request may further carry a first key, and the first key may be randomly generated in response to the electronic device being powered on for the first time.

In some embodiments, the first request further carries the first key, and the first key may be randomly generated when the electronic device is powered on for the first time. The first key may be stored after the first key is generated, and each electronic device corresponds to one first key. In practical application, a counterfeit device may be recognized via the first key of the electronic device. In detail, whether the key of the electronic device changes may be detected when the identity of the electronic device is authenticated through the digital certificate. In response to the key of the electronic device changing, it means that the electronic device has been counterfeited, and the identify authentication of the counterfeit electronic device may be refused.

In the above embodiments, the first request further carries the first key, and the first key may be randomly generated when the electronic device is powered on for the first time. In this way, it is possible to identify whether the electronic device is counterfeit by using the first key carried by the electronic device, and the security of the identity authentication of the electronic device may be improved.

In an embodiment, the device authentication method further includes the following operations: reading the first information from a storage medium of the electronic device; or downloading the first information from a second server, and the second server storing the first information corresponding to each of at least one electronic device.

In some embodiments, the first information may be read from the storage medium of the electronic device. The first information may be burnt into the electronic device in advance when a manufacturer of the electronic device is manufacturing the electronic device. The electronic device may be authenticated by using the first information read from the storage medium of the electronic device when the identity of the electronic device needs to be authenticated. In addition to burning the first information into the electronic device beforehand, it is also possible to download the corresponding first information from the second server. In some embodiments, the second server may be a server designated by the manufacturer of the electronic device. The second server stores the first information corresponding to each of the at least one electronic device. After being electrified and connected to the network, the electronic device may send a request to the second server to obtain the first information. Thus, the first information may be obtained in different ways.

In the above embodiments, the first information may be read from the storage medium of the electronic device, or the first information may be obtained by downloading from the second server. The second server stores the first information corresponding to each of the at least one electronic device. Thus, the first information may be obtained in different ways to achieve the identity authentication of the electronic device, and the applicability of the authentication of the electronic device may be improved.

Figure 3:
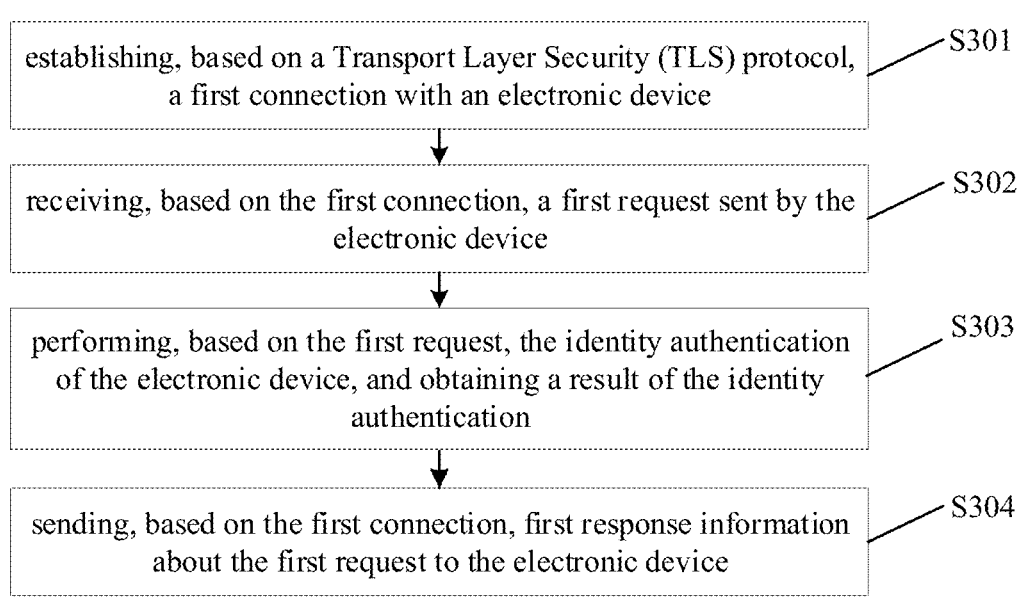
FIG. 3 is a schematic implementing flowchart of a device authentication method according to another embodiment of the present disclosure.

FIG. 3 illustrates another device authentication method according to an embodiment of the present disclosure. As shown in FIG. 3, the method may be performed by the first server, and the method may include following operations.

In an operation S301, a first connection may be established with the electronic device based on the TLS protocol.

The first connection may be established between the first server and the electronic device based on the TLS protocol. The first connection may be configured as a channel for data transmission between the first server and the electronic device. The first server may be configured to perform the identity authentication of the electronic device, and return the corresponding result of the identity authentication to the electronic device. In practical application, when the data is transmitted through the first connection established based on the TLS protocol, the transmitted data may be encrypted, such that the security of the information transmission may be guaranteed. In practical application, the first connection may be established between the first server and the electronic device based on the TLS protocol only when both the first server and the electronic device agree to use the TLS protocol.

In an operation S302, the first request sent by the electronic device may be received based on first connection. The first request may be configured to request for the identity authentication of the electronic device. The first request is generated based on first information. The first information may represent the digital certificate of the electronic device.

The first server may receive the first request sent by the electronic device based on the first connection. The first request may be configured to request for the identity authentication of the electronic device. The first request is generated based on the first information. The first information may represent the digital certificate of the electronic device. In some embodiments, the digital certificate may refer to the digital authentication of the identity information. The digital certificate of the electronic device may bind the identity of the electronic device with the electronic device, and the identity of the electronic device may be recognized through the digital certificate of the electronic device. For example, the digital certificate of the electronic device may be the device certificate of the electronic device, and the identities of different electronic devices may be recognized through the device certificates of the electronic devices. The digital certificate of the electronic device may also be the product certificate of the electronic device, and the product model of the electronic device may be determined through the product certificate. The first server may start preparing to perform the identity authentication of the electronic device when the first server receives the first request. In practical application, the first request may carry the device information of the electronic device, and the first server may receive the first request through the first connection. Thus, the security of the information transmission may be guaranteed.

In an operation S303, the identity authentication of the electronic device may be performed based on the first request, and the result of the identity authentication may be obtained.

The first server may perform the identity authentication of the electronic device based on the first request, and the result of the identity authentication may be obtained. In practical application, the first server may parse the digital certificate of the electronic device, and obtain the corresponding result of the identity authentication according to the parsed result of the digital certificate. For example, in response to the first server being capable of legally parsing the digital certificate of the electronic device, it means that the digital certificate of the electronic device is legal, and the result of the identity authentication representing that the identity authentication is successful may be generated. In response to the first server failing to legally parse the digital certificate of the electronic device, it means that the digital certificate of the electronic device is illegal, and the result of the identity authentication representing that the identity authentication is failed may be generated.

In an operation S304, the first response information about the first request may be sent to the electronic device based on the first connection, and the first response information may carry the result of the identity authentication.

In some embodiments, the first response information about the first request may be sent to the electronic device based on the first connection, and the first response information may carry the result of the identity authentication. In practical application, the first server may receive the first request sent by the electronic device through or via the first connection, and return or feed back the first response information to the electronic device through the first connection without other channels. In practical application, the first server may return the corresponding device certificate to the electronic device through the first connection when the first server is performing the identity authentication of the electronic device, and the security of the device certificate during transmission may be ensured. In practical application, the first information may be the device certificate of the electronic device, and the first server may perform the identity authentication of the electronic device according to the first information in the first request. The device certificate may be the certificate issued and sent by the trusted organization to prove the unique legal identity certificate of the device, and the format of the device certificate may be X.509. The legal device certificate is issued and sent by the trusted organization. In response to the first server being capable of legally parsing the device certificate, it means that the device certificate of the electronic device is legal, and the result of the identity authentication representing that the electronic device is legal may be generated. In response to the first server failing to legally parse the device certificate, it means that the digital certificate of the electronic device is illegal, and the result of the identity authentication representing that the electronic device is illegal may be generated.

In the above embodiments, the first connection based on the TLS protocol may be established between the first server and the electronic device. The first request sent by the electronic device may be received based on the first connection. The first request may be configured to request for the identity authentication of the electronic device. The first request may be generated based on the first information. The first information may represent the digital certificate of the electronic device. The identity authentication of the electronic device may be based on the first request, and the result of the identity authentication may be obtained. The first response information about the first request may be sent to the electronic device based on the first connection, and the first response information may carry the result of the identity authentication. In this way, the data transmission between the electronic device and the first server may be achieved through the connection channel based on the TLS protocol, and the authentication of the electronic device may be accomplished. Therefore, the security of the data transmission in the process of device authentication may be guaranteed, and the demand for the network resource in the authentication process may be reduced.

Figure 4:
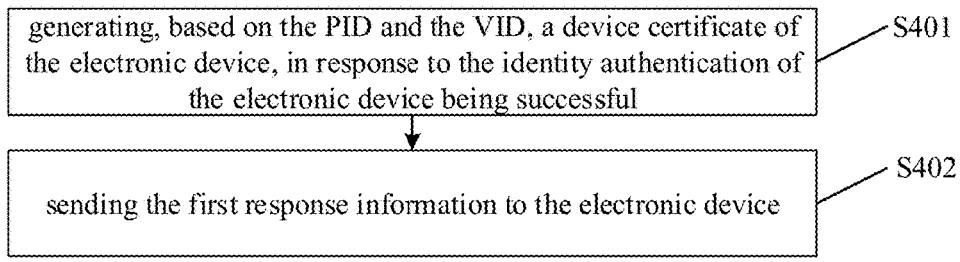
FIG. 4 is a schematic implementing flowchart of a device authentication method according to a further embodiment of the present disclosure.

In an embodiment, as shown in FIG. 4, the first information includes the product certificate of the electronic device. The first request carries at least the PID and the VID. The operation of sending the first response information about the first request to the electronic device includes the following operations.

In an operation S401, the device certificate of the electronic device may be generated based on the PID and the VID, in response to the identity authentication of the electronic device being successful.

The first request received by the first server carries the PID and the VID when the first information is the product certificate of the electronic device. In some embodiments, the product certificate contains or includes the PID, and the PID is determined from the product certificate. The VID is pre-configured or preset by electronic device. The product certificate is the legal identity certificate issued and sent to the electronic device of the same model, and the format of the product certificate may be X.509. In practical application, the product certificates of the electronic devices of the same model may be the same with each other. Therefore, the device certificate of the electronic device may be determined through both the VID and the PID in response to performing the identity authentication of the electronic device through the product certificate. In practical application, the first server may determine the legality of the electronic device according to the PID and the VID carried by the first request. The identity of the electronic device may be authenticated through the product certificate in the first information. The device certificate of the electronic device may be determined according to the PID and the VID carried by the first request when the first server successfully authenticates the identity of the electronic device. In practical application, the product certificates of the electronic devices of the same model may be the same with each other. Thus, the device certificate of the electronic device is needed to be determined according to the PID and the VID during the identity authentication of the electronic device via the product certificate. In practical application, the product certificates of the electronic devices of the same model may be the same with each other, and the identity of the electronic device may be authenticated according to the PID and the VID of the electronic device. Therefore, the first server may receive a bulk of VIDs sent by the electronic devices of the same model simultaneously, and thus the bulk identity authentication of the electronic devices may be achieved, and the efficiency of the identity authentication of the electronic device may be improved.

In an operation 402, the first response information may be sent to the electronic device, and the first information may carry the device certificate.

The first response information may be sent to the electronic device when the device certificate of the electronic device is determined. In some embodiments, the first response information may carry the device certificate, such that the identity of the electronic device may be authenticated according to the product certificate, and the corresponding device certificate may be allocated to the electronic device. In practical application, the first server may send the device certificate to the electronic device through the first connection without additional network resources to complete the sending of the device certificate, and the security of the device certificate during transmission may be ensured.

In above embodiments, the first information may include the product certificate of the electronic device, and the first request carries at least the PID and the VID. The device certificate of the electronic device may be generated based on the PID and the VID in response to the identity authentication of the electronic device being successful, the first response information may be sent to the electronic device, and the first response information may carry the product certificate. In this way, the identity of the electronic device may be authenticated according to the product certificate of the electronic device. Therefore, a bulk of the VIDs may be input to achieve the bulk identity authentication of the electronic device, and the device certificate may be sent to the electronic device. Furthermore, the security of the device certificate during transmission may be ensured, and the demand for the network resource may be reduced.

In an embodiment, the first request also carries a first key, the first key is randomly generated in response to the electronic device being powered on for the first time. The operation of performing the identity authentication of the electronic device and obtaining the result of the identity authentication includes the following operations: storing the VID and the first key correspondingly in response to the electronic device having never been activated; or determining whether the first key in the first request is the same as a second key in response to the electronic device having ever been activated, the second key being a key stored in the first server and corresponding to the VID; obtaining a result of the identity authentication indicating that the identity authentication of electronic device is successful in response to the first key being the same as the second key; obtaining a result of the identity authentication indicating that the identity authentication of electronic device is failed in response to the first key being different from the second key.

The first request received by the first server also carries the first key in case that the digital certificate of the electronic device is the product certificate. The first key may be randomly generated in response to the electronic device being powered on for the first time, and each electronic device corresponds to one key. During the identity authentication of the electronic device, the VID and the first key may be stored correspondingly in response to the electronic device having never been activated. In some embodiments, the electronic device having never been activated means that the first server has not yet send the device certificate to the current electronic device, and whether the electronic device has been activated may be determined by determining whether the first server stores the VID corresponding to the electronic device. For example, when the first server does not store the VID corresponding to the electronic device, it may be determined that the electronic device has never been activated, and the VID carried in the first information sent by the electronic device may be stored in association with the first key. When the electronic device has ever been activated, for example, if the first server stores the VID corresponding to the electronic device, it may be determined that the electronic device has ever been activated, which means that the first server has ever sent the device certificate to the electronic device, and the first server has recorded the VID corresponding to the electronic device and the key corresponding to the electronic device. Whether the first key is the same as the second key may be determined. The second key may be the key stored in the first server and corresponding to the VID. When the first key is the same as the second key, it indicates that the electronic device currently applying for the device certificate is the same as the electronic device which has been ever activated, the current electronic device has passed the identity authentication performed by the first server and has obtained the corresponding device certificate, and the result of the identity authentication indicating that the identity authentication of the electronic device is successful may be obtained. In practical application, the first server may send the device certificate, which has been issued to the electronic device when the electronic device was registered, to the electronic device through the first connection since the same electronic device can only apply for the device certificate once. Therefore, it is possible to ensure that the same device certificate is sent to the same electronic device, and it is possible to prevent sending multiple device certificates to the same electronic device. When the first key is different from the second key, it means that the electronic device applying for the device certificate is different from the electronic device which has ever been activated, and there is a risk that the electronic device fraudulently uses the VID to obtain the device certificate due to the leakage of the VID. In this case, the first server may return the result of the identity authentication indicating that the identity authentication of the electronic device is failed to the electronic device.

In the above embodiments, the first request also carries the first key, and the first key may be randomly generated when the electronic device is powered on for the first time. The VID and the first key may be stored correspondingly in response to the electronic device having never been activated, or, whether the first key of the first request is the same as the second key may be determined in response to the electronic device having ever been activated, and the second key may be the key corresponding to the VID stored in the first server. The result of the identity authentication indicating that the identity authentication of the electronic device is successful may be obtained in response to the first key being the same as the second key, and the result of the identity authentication indicating that the identity authentication of the electronic device is failed may be obtained in response to the first key being different from the second key. Therefore, it is possible to reduce the possibility of sending multiple device certificates to the same electronic device, the ability of recognizing the counterfeit electronic device may be improved, and the security of the electronic device may be guaranteed.

In an embodiment, in response to the identity authentication of the electronic device being failed, the method further includes the following operations: terminating the first connection.

The first connection between the first server and the electronic device may be terminated in response to the identity authentication of the electronic device, which is performed by the first server, being failed. In this way, it is possible to prevent the electronic device which is not successful authenticated from establishing a relationship or connection with the first server and obtaining the data from the first server.

In above embodiments, the first connection may be terminated in response to the identity authentication of the electronic device being failed. Therefore, the security of the related data of the electronic device may be protected, and the data leakage may be avoided.

Figure 5:
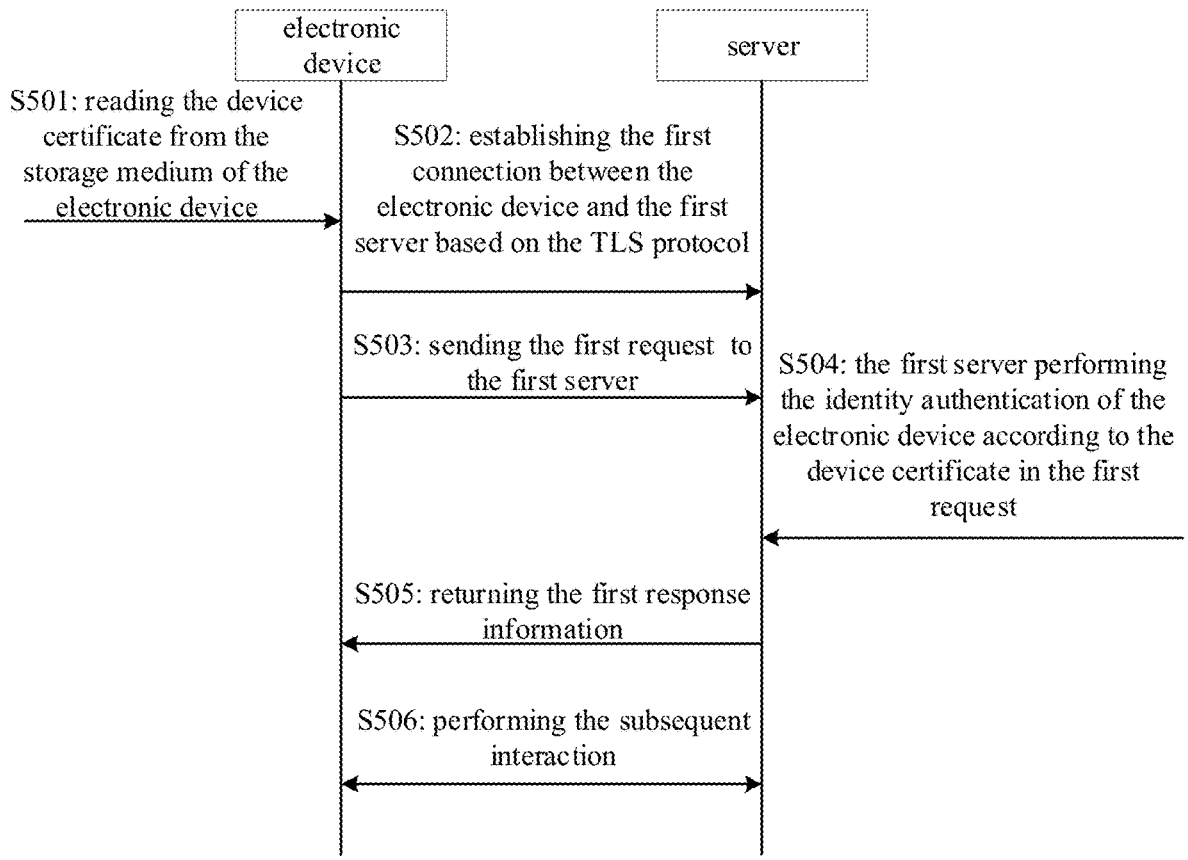
FIG. 5 is a schematic diagram illustrating an interaction during an identity authentication of the electronic device according to an application embodiment of the present disclosure.

In an embodiment, as shown in FIG. 5, FIG. 5 is a schematic diagram illustrating an interaction during an identity authentication of the electronic device according to an embodiment of the present disclosure.

In an operation S501, the device certificate may be read from the storage medium of the electronic device. The manufacturer may apply for the device certificates of the electronic devices in bulk in advance. The device certificates may be burnt in the electronic device during the manufacturing of the electronic device.

In an operation S502, the first connection may be established between the electronic device and the first server based on the TLS protocol. The data transmission may be performed between the electronic device and the first server through the first connection.

In an operation S503, the first request may be sent to the first server. The first request may be generated according to the device certificate of the electronic device, and the first request may be configured to request for the identity authentication of the electronic device.

In an operation S504, the first server may perform the identity authentication of the electronic device according to the device certificate in the first request.

In an operation S505, the first response information may be returned. The first response information may be returned to the electronic device in response to the first server completing the identity authentication of the electronic device. The first response information carries the result of the identity authentication of the electronic device, and the identity authentication is performed by the first server.

In an operation S506, the subsequent interaction may be proceeded or performed. The data interaction between the first server and the device may be continued in response to the identity authentication of the device being successful.

Figure 6:
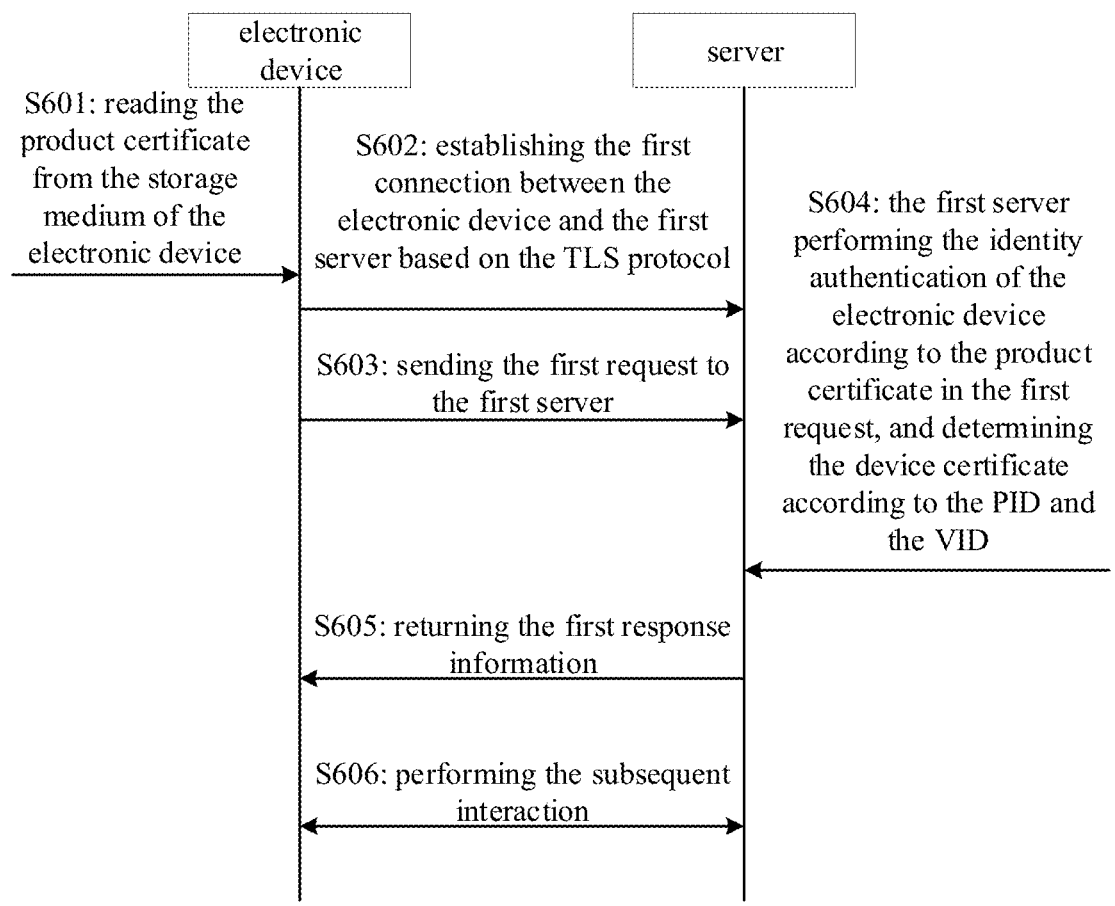
FIG. 6 is a schematic diagram illustrating an interaction during the identity authentication of the electronic device according to another application embodiment of the present disclosure.

In another embodiment, as shown in FIG. 6, FIG. 6 is a schematic diagram illustrating an interaction during identity authentication of the electronic device according to another application embodiment of the present disclosure.

In an operation S601, the product certificate may be read from the storage medium of the electronic device. The manufacturer may apply for the product certificates in bulk in advance. The product certificates may be written in a code during the manufacturing of the electronic device.

In an operation S602, the first connection may be established between the electronic device and the first server based on the TLS protocol. The data transmission may be performed between the electronic device and the first server through the first connection.

In an operation S603, the first request may be sent to the first server. The first request may be generated according to the product certificate of the electronic device. The first request carries the PID, the VID, and the first key. The first request may be configured to request for the identity authentication of the electronic device. In some embodiments, the PID may be determined from the product certificate, the VID may be written by the electronic device, and the first key may be generated randomly when the electronic device is powered on for the first time.

In an operation S604, the first server may perform the identity authentication of the electronic device according to the product certificate in the first request, and determine the device certificate according to the PID and the VID.

In an operation S605, the first response information may be returned. The first response information may be returned to the electronic device in response to the first server completing the identity authentication of the electronic device. The first response information carries the result of the identity authentication of the electronic device and the device certificate, and the identity authentication is performed by the first server, such that the electronic device may obtain the corresponding device certificate.

In an operation S606, the subsequent interaction may be proceeded or performed. The data interaction between the first server and the device may be continued in response to the identity authentication of the device being successful.

The descriptions above are simply some specific embodiments of the present disclosure, and the scope of the present disclosure is not limited thereto. Any variation or substitution readily comes to the mind of one of ordinary skill in the art within the technical scope of the present disclosure, may fall into the scope of the present disclosure. The scope of the present disclosure should be subjected to the scope of the claims.

Figure 7:
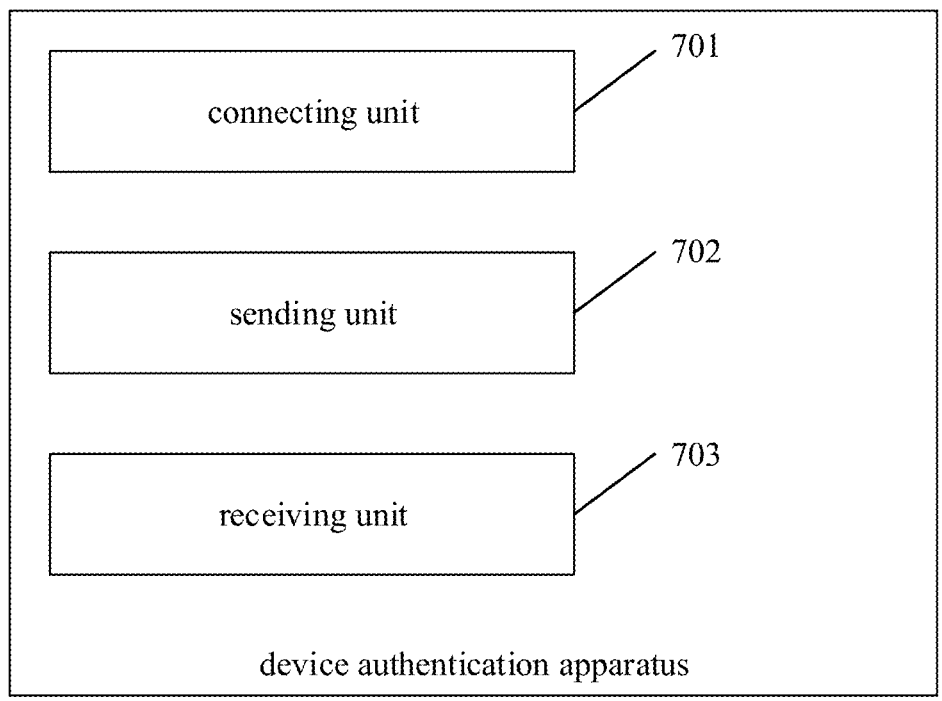
FIG. 7 is a schematic block diagram of a device authentication apparatus according to an embodiment of the present disclosure.

In order to achieve the methods described in some embodiments of the present disclosure, a device authenticate apparatus may be provided in some embodiments of the present disclosure. As shown in FIG. 7, the apparatus may include following components.

A connecting unit 701 may be configured to establish the first connection with the first server based on a Transport Layer Security (TLS) protocol.

A sending unit 702 may be configured to send the first request to the first server based on the first connection. The first request may be configured to request for the identity authentication of the electronic device, the first request is generated based on first information, and the first information may represent the digital certificate of the electronic device.

A receiving unit 703 may be configured to receive the first response information about the first request sent by the first server based on the first connection, and the first response information carries a result of the identity authentication of the electronic device, and the identity authentication is performed by the first server.

In an embodiment, the first request may include the device certificate of the electronic device.

In an embodiment, the first request may include the device certificate of the electronic device. In response to the sending unit 702 sending the first request to the first server based on the first connection, the sending unit 702 may further be configured to perform the following operations: determining a product identifier (PID) from the product certificate; and sending, based on the first connection, the first request to the first server. In some embodiments, the first request at least carries the PID and the vendor identifier (VID), and the VID is preset in the electronic device.

In an embodiment, the first request may also carry the first key, and the first key may be randomly generated in response to the electronic device being powered on for the first time.

In an embodiment, the device authentication apparatus may be further configured to perform the following operations: reading the first information from a storage medium of the electronic device; or downloading the first information from the second server. The second server stores the first information corresponding to each of at least one electronic device.

In practical application, the connecting unit 701, the sending unit 702, and the receiving unit 703 may be implemented by a processor of the device authentication apparatus. Of course, the processor may execute the programs stored in the memory to achieve the function of each program module.

Figure 8:
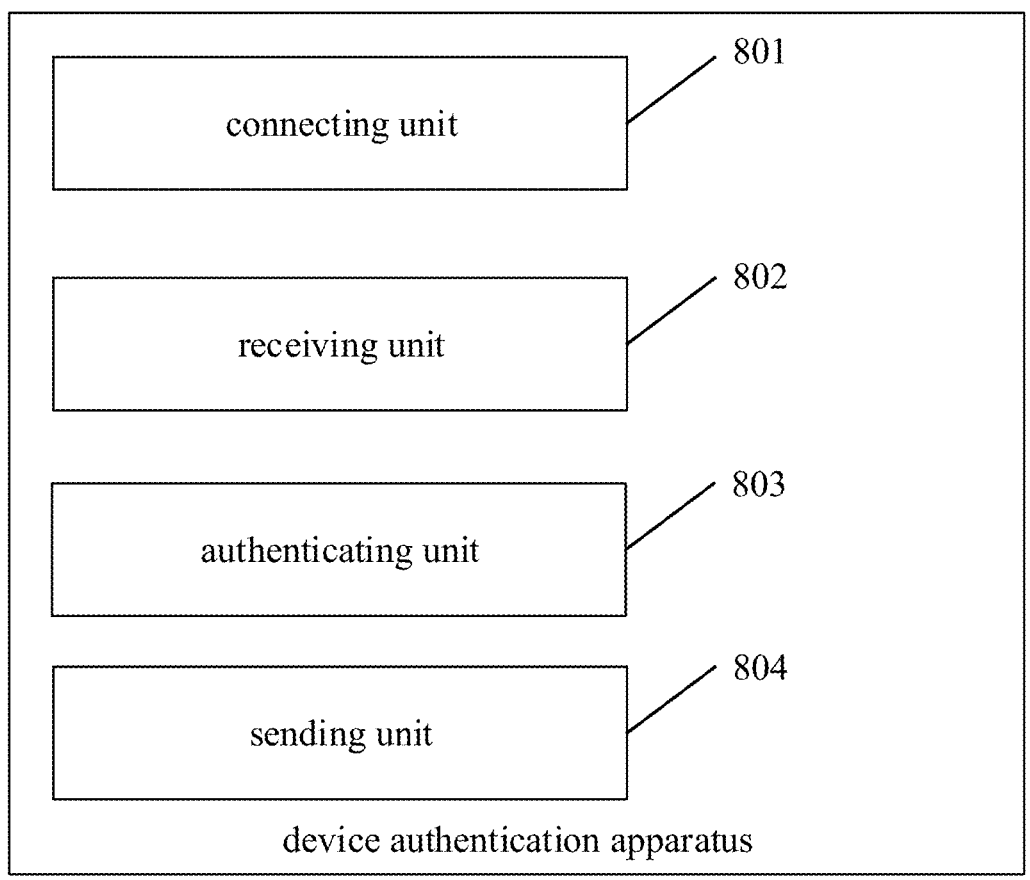
FIG. 8 is a schematic block diagram of a device authentication apparatus according to another embodiment of the present disclosure.

A device authentication apparatus may be provided in the embodiments of the present disclosure. As shown in FIG. 8, the apparatus may include the following components.

A connecting unit 801 may be configured to establish the first connection with the electronic device based on a Transport Layer Security (TLS) protocol.

A receiving unit 802 may be configured to receive the first request sent by the electronic device based on the first connection, the first request may be configured to request for the identity authentication of the electronic device, the first request is generated based on first information, and the first information may represent the digital certificate of the electronic device.

An authentication unit 803 may be configured to perform the identity authentication of the electronic device based on the first request, and a result of the identity authentication may be obtained.

A sending unit 804 may be configured to send the first response information about the first request to the electronic device based on the first connection, and the first response information may carry the result of the identity authentication.

In an embodiment, the first information may include the product certificate of the electronic device, the first request carries at least the product identifier (PID) and the vendor identifier (VID). In response to the sending unit 804 sending the first response information about the first request to the electronic device, the sending unit 804 may further be configured to perform the following operations: generating, based on the PID and the VID, the device certificate of the electronic device in response to the identity authentication of the electronic device being successful; and sending the first response information to the electronic device. The first response information carries the device certificate.

In an embodiment, the first request also carries the first key, the first key may be randomly generated in response to the electronic device being powered on for the first time. In response to the authentication unit 803 performing the identity authentication of the electronic device based on the first request and obtaining the result of the identity authentication, the authentication unit 803 may further be configured to perform the following operations: storing the VID and the first key correspondingly, in response to the electronic device having never been activated; or determining whether the first key in the first request is the same as a second key, in response to the electronic device having ever been activated, and the second key being the key stored in the first server and corresponding to the VID; obtaining a result of the identity authentication indicating that the identity authentication of the electronic device is successful, in response to the first key being the same as the second key; obtaining a result of the identity authentication indicating that the identity authentication of the electronic device is failed, in response to the first key being different from the second key.

In an embodiment, in response to the identity authentication of the electronic device being failed, the device authentication apparatus may further be configured to perform the following operations: terminating the first connection.

In practical application, the connecting unit 801, the receiving unit 802, the authentication unit 803, and the sending unit 804 may be achieved by the processor in the device authentication apparatus. Of course, the processor needs to execute programs stored in the memory to achieve the function of each program module.

It should be noted that, when the device authentication apparatus provided in the above embodiments shown in FIG. 7 and FIG. 8 performs the authentication on the device, a division of each program module described above is taken as an example to be illustrated. In practical application, the above operations may be assigned to and executed by different program modules according to requirements. That is, an internal structure of the apparatus may be divided into different program modules to complete all or part of the operations described above. In addition, the device authentication apparatus provided in the above embodiments belongs to a same concept as the device authentication method provided in the above embodiments, and the specific implementation processes may refer to the method embodiments and will not be repeatedly described herein.

Figure 9:
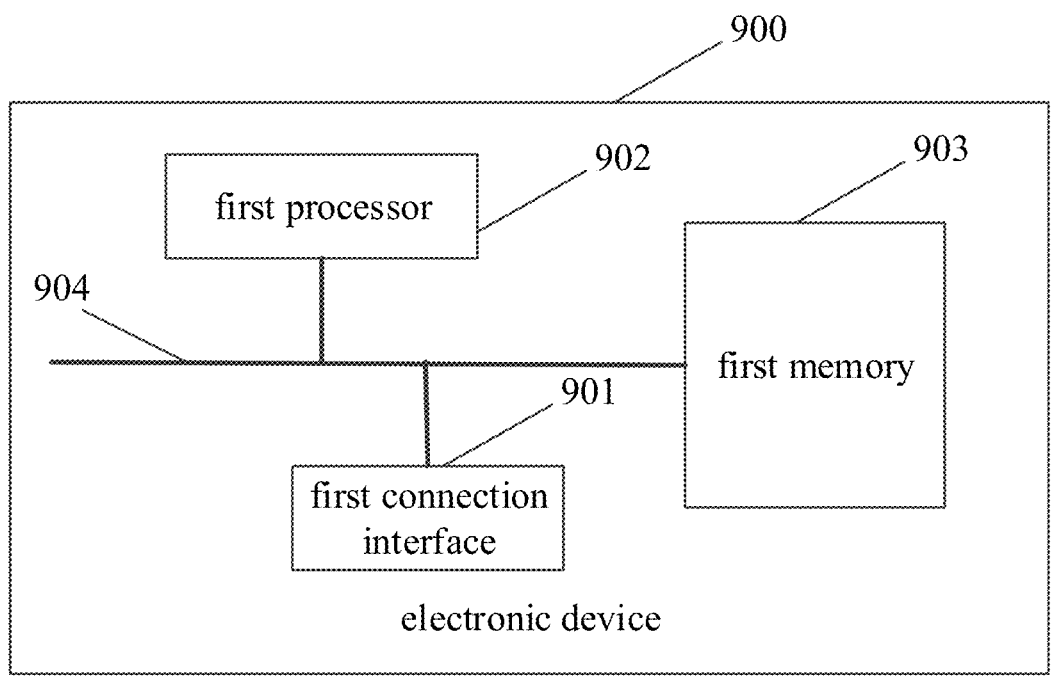
FIG. 9 is a schematic diagram of an electronic device according to an embodiment of the present disclosure.

Based on a hardware implementation of the above program modules, and in order to implement the method at the electronic device side according to some embodiments of the present disclosure, an electronic device may be provided in some embodiments of the present disclosure. As shown in FIG. 9, the electronic device 900 may include a first connection interface 901 and a first processor 902.

The first connection interface 901 is capable of exchanging information with the first server.

The first processor 902 is connected to the first connection interface 901 to exchange the information with the first server, and is configured to perform the method provided in one or more technical solutions at the electronic device side described above when executing computer programs. The computer programs may be stored in a first memory 903.

In detail, the first connection interface 901 may be configured to establish the first connection with a first server based on the Transport Layer Security (TLS) protocol; send the first request to the first server based on the first connection, and the first request being configured to request for the identity authentication of the electronic device, the first request being generated based on first information, and the first information representing the digital certificate of the electronic device; and receive the first response information about the first request sent by the first serve based on the first connection. The first response information carries the result of the identity authentication of the electronic device, and the identity authentication is performed by the first server.

In an embodiment, the first information includes the device certificate of the electronic device.

In an embodiment, the first information includes the product certificate of the electronic device. In response to the first connection interface 901 sending the first request to the first server based on the first connection, the first connection interface 901 may be configured to perform the following operations: determining the product identifier (PID) from the product certificate; and sending, based on the first connection, the first request to the first server. The first request at least carries the PID and a vendor identifier (VID), and the VID is preset in the electronic device.

In an embodiment, the first request further may carry the first key, and the first key may be randomly generated in response to the electronic device being powered on for the first time.

In an embodiment, the second processor 902 may further be configure to perform the following operations: reading the first information from the storage medium of the electronic device; or downloading the first information from the second server. The second server stores the first information corresponding to each of at least one electronic device.

It should be noted that, the specific operating processes of the first processor 902 and the first connection interface 901 may refer to the above methods for understanding.

Of course, in practical application, various components of the electronic device 900 may be coupled with each other through a bus system 904. It should be understood that, the bus system 904 is configured to implement connection communication among these components. In addition to the data bus, the bus system 904 further includes a power bus, a control bus, and a status signal bus. For clear descriptions, various buses are all shown as the bus system 904 in FIG. 9.

In the embodiment of the present disclosure, the first memory 903 is configured to store various types of data to support the operations of the electronic device 900. Examples of the data may include any computer program configured to be operated on the electronic device.

The method disclosed in some embodiments of the present disclosure may be performed by the first processor 902, or may be implemented by the first processor 902. The first processor 902 may be an integrated circuit chip with a capability of processing a signal. In an implementation process, each operation of method described above may be achieved by an integrated logic circuit in form of hardware or by instructions in form of software in the first processor 902. The first processor 902 described above may be a general-purpose processor, a digital signal processor (DSP), or another programmable logic device, a discrete gate or a transistor logic device, or a discrete hardware component, etc. The first processor 902 may achieve or perform each method, operation, and logical block diagram described in some embodiments of the present disclosure. The general-purpose processor may be a microprocessor, or any conventional processor, etc. The operations of the method described in combination with the embodiments of the present disclosure may be embodied to be executed and completed directly by a hardware decoding processor or by a combination of a hardware module and a software module in a decoding processor. The software module may be arranged in a storage medium, and the storage medium may be arranged in the first memory 903. The first processor 902 may read the information stored in the first memory 903, and execute the operations of the above methods in combination with the hardware of the first processor 902.

In illustrative embodiments, the electronic device 900 may be implemented by one or more of the following components to perform the above methods: an application specific integrated circuit (ASIC), the digital signal processor (DSP), the programmable logic device (PLD), a complex programmable logic device (CPLD), a field-programmable gate array (FPGA), the general-purpose processor, a controller, a micro controller unit (MCU), the microprocessor, and other electronic components.

Figure 10:
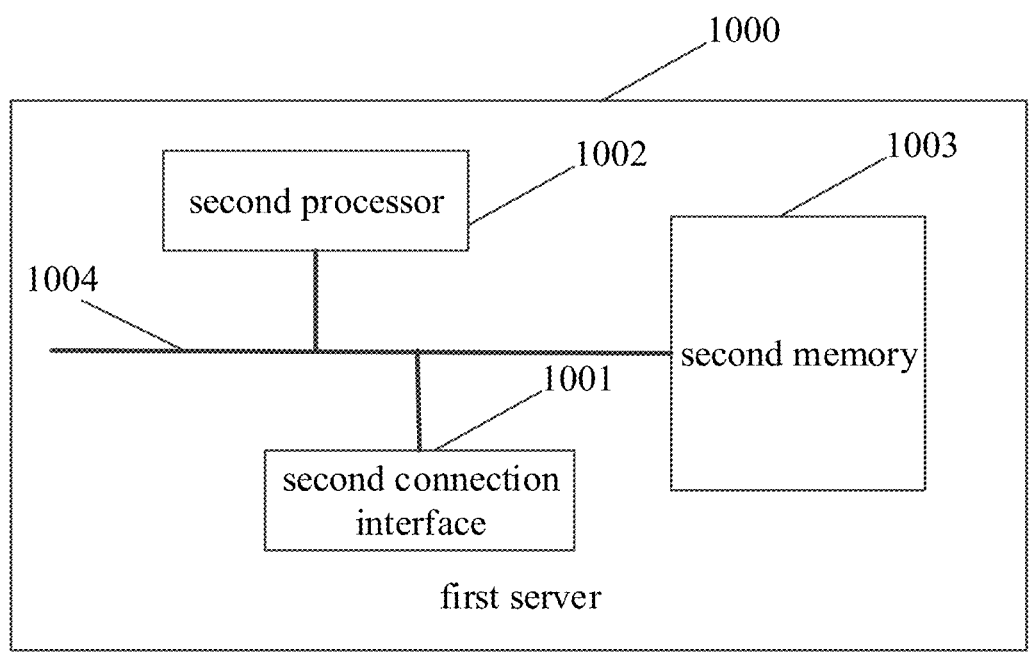
FIG. 10 is a schematic diagram of a first server according to an embodiment of the present disclosure.

Based on the hardware implementation of the above program modules, and in order to implement the method at the first server side provided in the embodiment of the present disclosure, a first server may be provided in the embodiments of the present disclosure. As shown in FIG. 10, the first server 1000 may include a second connection interface 1001 and a second processor 1002.

The second connection interface 1001 is capable of exchanging information with the electronic device.

The second processor 1002 is connected to the second connection interface 1001 to exchange the information with the electronic device, and is configured to perform the method provided in one or more technical solutions at the first server side described above when executing computer programs. The computer programs may be stored in the second memory 1003.

In detail, the second connection interface 1001 may be configured to establish the first connection with the electronic device based on the Transport Layer Security (TLS) protocol; and receive the first request sent by the electronic device based on the first connection. The first request may be configured to request for the identity authentication of the electronic device. The first request may be generated based on first information. The first information represents the digital certificate of the electronic device.

The second processor 1102 may be configured to perform the identity authentication of the electronic device based on the first request, and obtain the result of the identity authentication.

The second connection interface 1001 may be configured to send the first response information about the first request to the electronic device based on the first connection, and the first response information carries the result of the identity authentication.

In an embodiment, the first information includes the product certificate of the electronic device. The first request carries at least the product identifier (PID) and the vendor identifier (VID). The second processor 1002 may be configured to determine the device certificate of the electronic device based on the PID and the VID, in response to the identity authentication of the electronic device being successful.

The second connection interface 1001 may be configured to send the first response information to the electronic device, and the first response information carries the device certificate.

In an embodiment, the first request further carries the first key, the first key may be randomly generated in response to the electronic device being powered on for the first time. In response to the second processor 1002 performing the identity authentication of the electronic device and obtaining the result of the identity authentication, the second processor 1002 may perform the following operations: storing the VID and the first key correspondingly, in response to the electronic device having never been activated; or determining whether the first key in the first request is the same as a second key, in response to the electronic device having ever been activated, and the second key being the key stored in the first server and corresponding to the VID; obtaining a result of the identity authentication indicating that the identity authentication of the electronic device is successful, in response to the first key being the same as the second key; obtaining a result of the identity authentication indicating that the identity authentication of the electronic device is failed, in response to the first key being different from the second key.

In an embodiment, in response to the identity authentication of the electronic device being failed, the second connection interface may be configured to terminate the first connection.

It should be noted that, the specific operating processes of the second processor 1002 and the second connection interface 1001 may refer to the above methods for understanding.

Of course, in practical application, various components of the first server 1000 may be coupled with each other through a bus system 1004. It should be understood that, the bus system 1004 is configured to implement connection communication among these components. In addition to the data bus, the bus system 1004 further includes a power bus, a control bus, and a status signal bus. For clear descriptions, various buses are all shown as the bus system 1004 in FIG. 10.

In the embodiment of the present disclosure, the second memory 1003 is configured to store various types of data to support the operations of the first server 1000. Examples of the data may include any computer program configured to be operated on the electronic device.

The method disclosed in some embodiments of the present disclosure may be performed by the second processor 1002, or may be implemented by the second processor 1002. The second processor 1002 may be an integrated circuit chip with a capability of processing a signal. In the implementation process, each operation of method described above may be achieved by an integrated logic circuit in form of hardware or by instructions in form of software in the second processor 1002. The second processor 1002 described above may be a general-purpose processor, a digital signal processor (DSP), or another programmable logic device, a discrete gate or a transistor logic device, or a discrete hardware component, etc. The second processor 1002 may each method, operation, and logical block diagram described in some embodiments of the present disclosure. The general-purpose processor may be a microprocessor, or any conventional processor, etc. The operations of the method described in combination with the embodiments of the present disclosure may be embodied to be executed and completed directly by a hardware decoding processor or by a combination of a hardware module and a software module in a decoding processor. The software module may be arranged in a storage medium, and the storage medium may be arranged in the second memory 1003. The second processor 1002 may read the information stored in the second memory 1003, and execute the operations of the above methods in combination with the hardware of the second memory 1003.

In illustrative embodiments, the first server 1000 may be achieved by one or more of the following components to perform the above methods: the ASIC, the DSP, the PLD, a CPLD, a FPGA, the general-purpose processor, the controller, a MCU, the microprocessor, and other electronic components.

It should be understood that, the memory (the first memory 903 and the second memory 1003) according to some embodiments of the present disclosure may be a non-volatile memory or a volatile memory, or may include both the non-volatile memory and the volatile memory. In some embodiments, the non-volatile memory may be a Read Only Memory (ROM), a Programmable Read-Only Memory (PROM), an Erasable Programmable Read-Only Memory (EPROM), an Electrically EPROM (EEPROM), a Ferromagnetic Random Access Memory (FRAM), a Flash Memory, a magnetic surface memory, a CD (Compact Disc), or a CD-ROM (Compact Disc Read-Only Memory). The magnetic surface memory may be a magnetic disk memory or a magnetic tape memory. The volatile memory may be a random access memory (RAM), and may be configured as an external cache. By means of an exemplary but not limitative illustrations, many forms of RAM are available, such as a Static Random Access Memory (SRAM), a Synchronous Static Random Access Memory (SSRAM), a Dynamic Random Access DRAM (DRAM), a SDRAM (Synchronous Dynamic Random Access Memory), a DDRSDRAM (Double Data Rate Synchronous Dynamic Random Access Memory (DDRSDRAM), an Enhanced Synchronous Dynamic Random Access Memory (ESDRAM), a Synchronous Link Dynamic Random Access Memory (SLDRAM), and a Direct Memory Bus Random Access Memory (DRRAM). The memories described in the present disclosure may include, but be not limited to these memories and any other suitable types of memories.

In the illustrative embodiments, a storage medium may be provided in some embodiments of the present disclosure. The storage medium is a computer storage medium, specifically a computer-readable storage medium, such as the first memory 903 storing the computer programs, and the computer programs may be executable by the first processor 902 of the electronic device 900 to perform the operations of the methods at the electronic device side as described above. Or, the storage medium may also be the second memory 1003 storing the computer programs, and the computer programs may be executable by the second processor 1002 of the first server 1000 to perform the operations of the methods at the first server side as described above. The computer-readable storage medium may be a memory such as a FRAM, a ROM, a PROM, an EPROM, an EEPROM, a flash memory, a magnetic surface memory, a CD, a CD-ROM, etc.

It should be noted that, terms "first", "second", and the like are used to distinguish similar objects, and are not intended to describe a specific order or a sequence.

Furthermore, the technical solutions disclosed in some embodiments of the present disclosure may be combined arbitrarily in a case without conflict.

The descriptions above are simply some specific embodiments of the present disclosure, and the scope of the present disclosure is not limited thereto. Any variation or substitution readily comes to the mind of one of ordinary skill in the art within the technical scope of the present disclosure, may fall into the scope of the present disclosure. The scope of the present disclosure should be subjected to the scope of the claims.

What is claimed is:

1. A device authentication method, applied to an electronic device, the method comprising:
   establishing, based on a Transport Layer Security (TLS) protocol, a first connection with a first server;
   sending, based on the first connection, a first request to the first server to perform an identity authentication of the electronic device, the first request is generated based on first information, wherein the first information comprises a device certificate and a product certificate of the electronic device wherein the sending of the first request to the first server, comprises:
      determining a product identifier (PID) from the product certificate, and sending, based on the first connection, the first request to the first server, wherein the first request at least carries the PID determined from the product certificate and a vendor identifier (VID) that is preset in the electronic device;

receiving, based on the first connection, first response information about the first request, wherein the first response information is sent by the first server and carries a result of the identity authentication of the electronic device, and the identity authentication is performed by the first server; and in response to the result of the identity authentication of the electronic device being successful, receiving a digital device certificate of the electronic device generated based on the PID and the VID.

2. The device authentication method as claimed in claim 1, wherein the first request further carries a first key, and the first key is randomly generated in response to the electronic device being powered on for a first time.

3. The device authentication method as claimed in claim 1, further comprising: reading the first information from a storage medium of the electronic device; or downloading the first information from a second server, wherein the second server stores the first information corresponding to each of at least one electronic device.

4. The device authentication method as claimed in claim 1, wherein the device certificate is burnt in the electronic device.

5. A device authentication method, applied to a first server, the method comprising:
   establishing, based on a Transport Layer Security (TLS) protocol, a first connection with an electronic device;
   receiving, based on the first connection, a first request sent by the electronic device to perform an identity authentication of the electronic device, the first request is generated based on first information, wherein
      the first information comprises a device certificate and a product certificate of the electronic device, and
      the first request carries at least a product identifier (PID) determined from the product certificate and a vendor identifier (VID) preset in the electronic device;
   performing, based on the first request, the identity authentication of the electronic device, and obtaining a result of the identity authentication; and
   sending, based on the first connection, first response information about the first request to the electronic device, wherein the first response information carries a result of the identity authentication, wherein the sending of the first response information about the first request to the electronic device, comprises:
      generating, based on the PID and the VID, a digital device certificate of the electronic device, in response to the identity authentication of the electronic device being successful, and
      sending the first response information to the electronic device, wherein the first response information carries the digital device certificate generated based on the PID and the VID.

6. The device authentication method as claimed in claim 5, wherein:
   the first request further carries a first key, the first key is randomly generated in response to the electronic device being powered on for a first time; and
   the performing the identity authentication of the electronic device and obtaining the result of the identity authentication, comprises:
      storing the VID and the first key correspondingly, in response to the electronic device having never been activated; or
      determining whether the first key in the first request is the same as a second key, in response to the electronic device having ever been activated, wherein the second key is the key stored in the first server and corresponding to the VID;
   obtaining the result of the identity authentication indicating that the identity authentication of the electronic device is successful, in response to the first key being the same as the second key;
   obtaining the result of the identity authentication indicating that the identity authentication of the electronic device is failed, in response to the first key being different from the second key.

7. The device authentication method as claimed in claim 6, further comprising: sending, via the first connection, the device certificate to the electronic device, in response to the first key being the same as the second key; wherein the device certificate is the one that has been issued to the electronic device when the electronic device was registered.

8. The device authentication method as claimed in claim 7, wherein one electronic device is able to receive a same device certificate.

9. The device authentication method as claimed in claim 5, in response to the identity authentication of the electronic device being failed, the method further comprising: terminating the first connection.

10. An electronic device, comprising:
    a processor; and
    a memory configured to store computer programs executable by the processor, wherein when executing the computer programs, the processor is configured to
    establish, based on a Transport Layer Security (TLS) protocol, a first connection with a first server;
    send, based on the first connection, a first request to the first server to perform an identity authentication of the electronic device, the first request being generated based on first information, wherein the first information comprises a device certificate and a product certificate of the electronic device, wherein the sending of the first request to the first server, comprises:
       determining a product identifier (PID) from the product certificate, and
       sending, based on the first connection, the first request to the first server, wherein the first request at least carries the PID determined from the product certificate and a vendor identifier (VID) that is preset in the electronic device;
    receive, based on the first connection, first response information about the first request, wherein the first response information is sent by the first server and carries a result of the identity authentication of the electronic device, and the identity authentication is performed by the first server; and
    in response to the result of the identity authentication of the electronic device being successful, receive a digital device certificate of the electronic device generated based on the PID and the VID.

11. The electronic device as claimed in claim 10, wherein the first request further carries a first key, and the first key is randomly generated in response to the electronic device being powered on for a first time.

12. The electronic device as claimed in claim 10, wherein the processor is further configured to: read the first information from a storage medium of the electronic device; or download the first information from a second server, wherein the second server stores the first information corresponding to each of at least one electronic device.

13. The electronic device as claimed in claim 10, wherein the device certificate is burnt in the electronic device.

\* \* \* \* \*